: 3,341,446
PROCESS FOR THE PRODUCTION OF A SINGLE-FRAME CATALYZER ELECTRODE AND PRODUCT
Wolf Vielstich, Bonn, Germany, and Egbert Guth, Neuenhof, Heinz Gunther Plust, Spreitenbach, and Carl Georg Telschow, Zurich, Switzerland, assignors to Aktiengesellschaft Brown, Boveri & Cie, Baden, Switzerland, a joint-stock company
No Drawing. Filed Nov. 1, 1962, Ser. No. 234,843
Claims priority, application Germany, Nov. 3, 1961, V 21,546; Sept. 7, 1962, A 41,106
10 Claims. (Cl. 204—284)

Porous catalyzer electrodes for fuel elements for the electrochemical decomposition of gaseous or liquid fuels with oxygen or air, and for $H_2$ separation in electrolysis cells, have recently become known in the form of so-called double-frame catalyzer (D.F.C.) electrodes. These double-frame electrodes consist of an electrically conductive frame in which grains of Raney metal are embedded. They have been specially developed for so-called gas-diffusion electrodes.

In order to produce them, the Raney metal of the corresponding catalyst metal must first of all be obtained, and then milled down to a fine powder. From this Raney metal, a suitable grain-size interval is selected by wind-separation or sieving, mixed with a powder of a catalytically inactive frame material, pressed, and sintered at 600–1000° C. in a reducing atmosphere. The production of such electrodes on the technical scale is a relatively involved and costly process, and in order to attain high degrees of activity it requires special methods of treatment, such, for example, as potential-controlled activation, and requires the addition of other metals if a series of Raney catalyst metals, for example silver, are to be produced.

It has been found that catalyzer electrodes of equally good or even better properties can be produced if the double-frame structure, which is technically difficult to reproduce on a large scale, is abandoned, and limitation to single-frame structure is accepted. In fact, the decisive factor as regards catalytic activity is not the presence of the Raney metal, but solely the dispersed surface structure of the catalyst metal. For example, Horner has shown that highly active nickel having better catalytic properties than freshly activated Raney nickel may be obtained by adding $H_2O$-free $NiCl_2$ from a sodium melt in naphthalene (L. Horner, Dechema Working Committee "Electrochemical Processes," Frankfurt, November 1960).

Single-frame catalyzer electrodes having optimum porosity and an inner surface for use in electrochemical devices are made in accordance with the invention by mixing a powder of catalytically active metals (for example Ni, Cd, Ag, Pt, Pd, Rh, Pb) with a powder of catalytically inactive metals that is soluble in lye or acid (for example Al, Zn, Mg or Ni, Co, Fe, Cu), the said powders being pressed into a shaped piece and sintered or hot-pressed, the shaped piece then being treated with lye or acid in order to dissolve out the inactive components.

As opposed to double-frame electrodes, powdered alloys (Raney alloys) are not used in this case, but only the powders of the catalytically active insoluble components and of the catalytically inactive soluble components. A porous frame member of the active catalyst material (single frame) remains, and its mechanical rigidity depends to a large extent on the composition of the powder mixture. The composition must therefore be adapted to the intended use in any particular case, or to the type of backing for the catalyst (for example sieves or sheets of metals).

An advantageous composition for the powder mixture used in producing single-frame electrodes consists of 5 to 70 percent by weight (preferably 15 to 20 percent by weight) of the inactive material capable of being dissolved out, and 30 to 95 percent by weight (preferably 50 to 85 percent by weight) of the active catalyst material.

Both the inactive and active powders may consist of a mixture of the metals in question.

The most favourable temperature for sintering depends upon the metal mixture as well as upon the kind of metal and in general lies between 350 and 800° C. The metal powder is either cold-pressed before sintering, or the powder mixture is simultaneously pressed and sintered. In some circumstances it is also expedient to temper under pressure up to 200 to 500° C., and then carry out the sintering operation as such without pressure.

When the metal powders are being mixed, a boundary surface linkage is set up to only a very slight degree between the active and inactive metal grains, and can be transformed by the subsequent heat-treatment into phases between the two metals disposed in the form of a layer on the active metal grains.

Such phase-mixtures, from which the inactive metal is dissolved out, lead to active metal surfaces having particularly good catalytic and electromechanical properties. However, it is found that after this treatment the mixed phases occur only to a slight degree, so that they scarcely yield any advantages as regards the catalytic properties and thus the electrochemical utility of the electrode material as opposed to the active metal, because the active metal atoms become re-grouped upon the inactive metal being dissolved out of ordered mixed phases.

It has accordingly proved to be advantageous to mix the metal powders under mechanical pressure.

Mixing under mechanical pressure differs from conventional mixing by simple stirring, shaking etc., for example in a container in the shape of a cube, in that the powder mixture is simultaneously pressed while mixing is in progress. This is done, for example, in a rotating vessel in which the powder is simultaneously pressed by a roller-like device. In this connection, pressures which impart plastic deformation to the inactive metal grains are applied.

With a powder mixture which has been mixed under mechanical pressure, multi-phase layers form to a large degree after heat-treatment on the surface of the active metal grains, and, for example, if nickel is used as the catalytically active metal and aluminium as the catalytically inactive metal the said multi-phase layers are present in the form of a $NiAl_3$ and $Ni_2Al_3$ composition. After the inactive metal components, in the present case aluminium, have been dissolved out, these layers form an extremely active surface.

A further advantage of mixing under mechanical pressure is that any layer of oxide which may be present on the surfaces of the inactive metal grains is simultaneously broken up. This considerably improves the interaction between the active and inactive metal grains, so that after mixing and heat-treatment the active metal grains exhibit the desired mixed phases over the whole surface. This advantage is particularly great in the case of inactive metals such as aluminium, which oxidize very easily.

Finally, there is the advantage that the active metal grains may be sintered in the pressed piece even at relatively low temperatures, below the minimum melting point of the system, in order to produce a mechanically rigid frame with the formation of bridges between the majority of all the active metal grains. In the example of a powder mixture composed of nickel and aluminium, mechanically stable Ni/Ni bridges are produced by sintering at 460 to 600° C., and as opposed to Raney nickel are not destroyed even by chemical activation, dissolving out the aluminium, so that a mechanically stable electrode member is obtained.

There is the possibility that the shaped piece obtained after mixing under mechanical pressure and pressing will be annealed and melt upon heating to sintering temperature, so that finally there is the disadvantage of a Raney alloy being present, and this alloy cannot be processed to make a shaped gas-diffusion electrode. This disadvantageous phenomenon can easily be avoided if before sintering the shaped piece is tempered at a temperature at which no annealing occurs. It is advantageous to carry out tempering in a number of steps below annealing temperature, increasing the temperature each time. Thereupon, sintering may be carried out without disadvantageous consequences, and finally the catalytically inactive metal components may be dissolved out by treatment with lye or acid. If nickel and aluminum are used, as already mentioned, it is expedient to carry out tempering between 350 and 450° C.

The production of a single-frame catalyzer electrode according to the invention will be described with reference to an example.

The starting point is a powder mixture consisting of 32 percent by weight of nickel and 68 percent by weight of aluminium (corresponding to about 50 percent by atoms in each case). The grain size should be between 10 and 40μ. The powder is intimately mixed for one hour in a pressure-mixing device. Shaped pieces, 40 mm. in diameter, are then pressed out from 13 g. of the powder mixture in each case. The pressure applied is 4 tons/cm.², giving a volume filling of about 80%. Thereupon the shaped pieces are placed on a nickel support in a quartz tube in an extremely pure hydrogen atmosphere, and first tempered for 2 hours at 400° C., and then for 2 hours at 440° C. The temperature is then raised to 550° C., and sintering is carried out for half an hour at this temperature. Cooling is carried out for 1 hour to a temperature below 50° C. For activating the inner surface aluminium is now dissolved out of the sintered pieces. To this end, the sintered pieces are treated as follows:

| | Hours |
|---|---|
| With n/10 KOH at 25° C. | 24 |
| With 2n KOH at 25° C. | 24 |
| With 2n KOH at 50° C. | 24 |
| With 6n KOH at 50° C. and | 24 |
| With 6n KOH at 80° C. | 24 |

In this connection, it is appropriate to add tartaric acid as a complex compound-forming agent to the potassium lye.

It is often appropriate, for reasons of economy and at the same time to give greater mechanical rigidity, to provide a metal backing (sheet metal, sieve or network) with a thin coating of the single-frame material. In most cases, the backing also serves to feed the current in.

Single-frame catalyzer electrodes according to the invention are particularly suitable, as are double-frame catalyzer electrodes, as catalyzer electrodes for the electrochemical decomposition of fuels and for $H_2$ separation in electrolysis cells. They are distinguished by a high degree of simplicity in production, and by their considerably larger inner surface as compared to double-frame catalyzer electrodes, since in this case there is no need to use any bracing-frame material which dilutes the active material. As a consequence, a considerably greater load can be withstood with a given degree of polarization.

Single-frame catalyzer electrodes are suitable for use as electrodes in electrolysis cells, since they exhibit very slight excess voltages and degrees of polarization even with technical amounts of current. Thus, single-frame electrodes made of nickel are particularly suitable for separating $H_2$ from an aqueous alkaline solution. Such nickel electrodes may be advantageously used in the technical electrolysis of water. Surprisingly, however, they may also be put to use in potassium chloride electrolysis and in amalgam-hydrogen elements. In fact, it has been found that small quantities of mercury dissolved in the electrolyte or distributed in dispersed fashion do not have any detrimental effect on the activity of the electrodes even in technically interesting experiments of long duration.

Single-frame catalyzer electrodes according to the invention are useful, just as are double-frame catalyzer electrodes, in fuel elements for decomposing fuels dissolved in electrolytes, but their output is considerably greater for the reasons mentioned above.

In alkaline electrolytes single-frame electrodes made of nickel are to be preferred, and in acid electrolytes corresponding electrodes made of metals in the platinum group and mixtures of these metals with titanium and/or tantalum have proved satisfactory. Electrodes produced for cells with an acid electrolyte must also be treated after pressing and sintering with lye or acid in order to dissolve out the inactive metals which set up porosity.

When lyes are used as the electrolyte the catalytically active metal may be a member of the group consisting of Ni, Cd, Ag, Pt, Cr, Rh and Pd and the catalytically inactive metal capable of being dissolved out may be a member of the group consisting of Al, Zn, Mg, W, Mo and Fe. When an acid or neutral solution is used as the electrolyte the catalytically active metal may be a member of the group consisting of Pb, Pd, Pt, Ir, Rh, Ti, Ta and Cr and the catalytically inactive metal capable of being dissolved out may be a member of the group consisting of Al, Zn, Mg, Ni, Ag, Cu and Fe.

Single-frame electrodes made of nickel and cadmium for alkaline accumulators exhibit especially advantageous properties. Because they make better use of the material (larger inner surface), they have a higher capacity per gram mass than corresponding electrodes of double-frame structure.

We claim:

1. Process for the production of a single-frame catalyzer electrode of optimum porosity and inner surface for use in electrochemical devices which comprises mixing a powder of a catalytically active metal selected from the group consisting of Ni and Ag with a powder of a catalytically inactive metal selected from the group consisting of Al and Zn under sufficient mechanical pressure to effect plastic deformation of the inactive metal grains, pressing the mixture into a shaped piece, sintering the shaped piece and then treating the shaped piece with a lye to dissolve out the catalytically inactive components.

2. Process according to claim 1, characterized in that the mixture consists of 30 to 95 percent by weight of the catalytically active metal and 5 to 70 percent by weight of the catalytically inactive metal.

3. Process according to claim 1 in which the mixture consists of 50 to 85 percent by weight of the catalytically active metal and 15 to 50 percent by weight of the catalytically inactive metal.

4. Process as defined in claim 1 in which the catalytically active metal is Ni and the catalytically inactive metal is Al.

5. Process according to claim 1 characterized in that the pressed powder mixture is sintered at a temperature between 350 and 800° C.

6. Process according to claim 1 characterized in that the metal powders mixed under mechanical pressure and pressed into a shaped piece are sintered at a temperature below the minimum melting point of the system.

7. Process according to claim 6 characterized in that before sintering the shaped piece is tempered at a temperature at which annealing does not occur.

8. Process according to claim 7 characterized in that tempering is carried out in a series of steps below annealing temperature, increasing the temperature each time.

9. Process according to claim 1 characterized in that nickel and aluminium powders are mixed under mechanical pressure and pressed into a shaped piece, which is tempered at 350 to 450° C. and sintered at 460 to 600° C., and then treated with an alkaline solution of increasing concentration and temperature.

10. Single-frame catalyzer electrode, produced by the process according to claim 1.

References Cited

UNITED STATES PATENTS

| | | | |
|---|---|---|---|
| 2,583,619 | 1/1952 | White | 252—477 |
| 2,860,175 | 11/1958 | Justi | 136—120 |
| 3,068,157 | 12/1962 | Vieltich et al. | 204—99 |
| 3,121,031 | 2/1964 | Gruneberg et al. | 136—86 |

FOREIGN PATENTS

| | | |
|---|---|---|
| 215,847 | 1/1958 | Australia. |
| 592,130 | 2/1934 | Germany. |

JOHN H. MACK, *Primary Examiner.*

R. K. MIHALEK, *Assistant Examiner.*